United States Patent
Briand et al.

(10) Patent No.: US 8,710,400 B2
(45) Date of Patent: Apr. 29, 2014

(54) METHOD FOR CUTTING C—MN STEEL WITH A FIBER LASER

(75) Inventors: Francis Briand, Paris (FR); Karim Chouf, Levallois Perret (FR); Hakim Maazaoui, Cergy St Christophe (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 13/152,159

(22) Filed: Jun. 2, 2011

(65) Prior Publication Data

US 2012/0012570 A1    Jan. 19, 2012

Related U.S. Application Data

(63) Continuation of application No. 11/560,287, filed on Nov. 15, 2006, now abandoned.

(30) Foreign Application Priority Data

Nov. 25, 2005   (FR) ...................................... 05 53605

(51) Int. Cl.
   *B23K 26/40*   (2006.01)
   *B23K 26/14*   (2006.01)

(52) U.S. Cl.
   USPC ............................... 219/121.67; 219/121.84

(58) Field of Classification Search
   USPC .............. 219/121.72, 121.73, 121.67, 121.84
   See application file for complete search history.

(56) References Cited

U.S. PATENT DOCUMENTS

| | | | |
|---|---|---|---|
| 4,759,604 A * | 7/1988 | Utsumi et al. | 385/126 |
| 5,073,694 A | 12/1991 | Tessier et al. | |
| 5,180,450 A * | 1/1993 | Rao | 148/579 |
| 5,380,976 A * | 1/1995 | Couch et al. | 219/121.72 |

(Continued)

FOREIGN PATENT DOCUMENTS

| | | |
|---|---|---|
| DE | 19859243 | 7/2000 |
| DE | 19859243 A1 * | 7/2000 |

(Continued)

OTHER PUBLICATIONS

Penn et al., "Trends in Laser Material Processing for Cutting, Welding, and Material Deposition using Carbon Dioxide, Direct Diode, and Fiber Lasers", Mar. 2005, Proceedings of SPIE vol. 5706, pp. 25-37.*

(Continued)

*Primary Examiner* — Geoffrey S Evans
(74) *Attorney, Agent, or Firm* — Elwood L. Haynes

(57) ABSTRACT

The invention relates to a laser cutting method for cutting a C—Mn steel workpiece, characterized in that laser beam generation means comprising at least one silica fiber with an ytterbium-doped core is used to generate the laser beam. Preferably, the ytterbium-based fiber has a wavelength between 1.07 and 1.1 μm, preferably 1.07 μm, the quality factor of the laser beam is between 0.33 and 8 mm.mrad, and the laser beam has a power of between 0.1 and 25 kW. The assistance gas for the laser beam is chosen from nitrogen, helium, argon, oxygen, $CO_2$ and mixtures thereof, and, optionally, it further contains one or more additional compounds chosen from $H_2$ and $CH_4$.

9 Claims, 3 Drawing Sheets

(56) References Cited

U.S. PATENT DOCUMENTS

| | | | |
|---|---|---|---|
| 6,040,549 A * | 3/2000 | Kanaoka | 219/121.72 |
| 6,085,786 A | 7/2000 | Forsythe | |
| 6,208,458 B1 | 3/2001 | Galvanauskas et al. | |
| 6,313,432 B1 * | 11/2001 | Nagata et al. | 219/121.72 |
| 6,813,923 B2 | 11/2004 | Jones et al. | |
| 7,004,637 B1 * | 2/2006 | Uyama et al. | 384/544 |
| 7,054,341 B2 | 5/2006 | Hermann et al. | |
| 7,348,517 B2 * | 3/2008 | Egawa et al. | 219/121.73 |
| 2001/0019043 A1 * | 9/2001 | Bertez et al. | 219/121.67 |
| 2002/0162604 A1 * | 11/2002 | Matile | 148/194 |
| 2003/0055413 A1 * | 3/2003 | Altshuler et al. | 606/9 |
| 2003/0192865 A1 * | 10/2003 | Cole et al. | 219/121.67 |
| 2003/0209049 A1 * | 11/2003 | Jones et al. | 72/342.5 |
| 2004/0089643 A1 | 5/2004 | Jones et al. | |
| 2005/0067393 A1 * | 3/2005 | Olivier | 219/121.75 |
| 2005/0094684 A1 * | 5/2005 | Hermann et al. | 219/121.6 |
| 2005/0169326 A1 * | 8/2005 | Jacob et al. | 372/22 |
| 2006/0044981 A1 | 3/2006 | Egawa et al. | |
| 2007/0119833 A1 | 5/2007 | Briand et al. | |
| 2007/0119834 A1 | 5/2007 | Briand et al. | |
| 2007/0151961 A1 | 7/2007 | Kleine et al. | |
| 2012/0024831 A1 | 2/2012 | Briand et al. | |

FOREIGN PATENT DOCUMENTS

| | | |
|---|---|---|
| EP | 0770448 | 5/1997 |
| JP | 2003053577 | 2/2003 |
| JP | 2004-291031 A * | 10/2004 |
| JP | 2004291031 | 10/2004 |
| WO | WO 9623624 | 8/1996 |
| WO | WO-03/018246 A1 * | 3/2003 |
| WO | WO-2005-053895 A1 * | 6/2005 |
| WO | WO 2005053895 | 6/2005 |
| WO | WO 2005074573 | 8/2005 |

OTHER PUBLICATIONS

Shiner, "Fiber Lasers for Material Processing", Mar. 2005, Proceedings of SPIE vol. 5706, pp. 60-68.*
Email from Terence Solomon on Jul. 29, 2009.*
Niu et al., The Laser Beam Quality Factor M2 and its measurement, Dec. 1998, SPIE vol. 3550, pp. 378-382.*
Kleine et al., "Fiber Laser for Micro-Cutting of Metals", 2003, SPIE vol. 4974, pp. 184-192.*
Kleine et al., "Pulse Shaping for Micro-Cutting Applications of Metals with Fiber Lasers", 2004, SPIE vol. 5339, pp. 510-517.*
O'Neill et al., "New Developments in laser-assisted oxygen cutting", Dec. 2000, Elsevier, Optics and Lasers in Engineering, vol. 34, pp. 355-367.*
Carroll, "Experimental study of cutting thick aluminum and steel with a chemical oxygen-iodine laser using an N2 or O2 gas assist", Jan. 1997, SPIE, vol. 3092, pp. 758-763.*
FR0553605, French Search Report, Jul. 11, 2006.
FR0553607, French Search Report, Jul. 11, 2006.
Grupp, M. et al., "Fibre lasers—A new high power beam source for materials processing," Bremen, Sep. 2003.
Kleine, K.F. et al., "Pulse shaping for micro-cutting applications of metals with fiber lasers," 2004, SPIE, vol. 5339, pp. 510-517.
Kleine, K.F. et al., "Use of Fiber Lasers for Micro Cutting Applications in the Medical Device Industry," Proceedings of the 21st International Congress on Applications of Lasers and Electro-Optics, Scottsdale, Arizona, Oct. 14-17, 2002 (ICALEO 2002).
Penn et al., "Trends in laser material processing for cutting, welding, and metal depositions using carbon dioxide, direct diode, and fiber lasers," Mar. 2005, Proceedings of SPIE, vol. 5706, pp. 25-37.
Shiner, B., "Fiber lasers for material processing," LIA Today Archives, Apr. 2004.
Press Release: "IPG Demonstrates High Brightness 5kW Fiber Laser," May 6, 2004.
E-mail from Terence Solomon, Jul. 29, 2009.

* cited by examiner

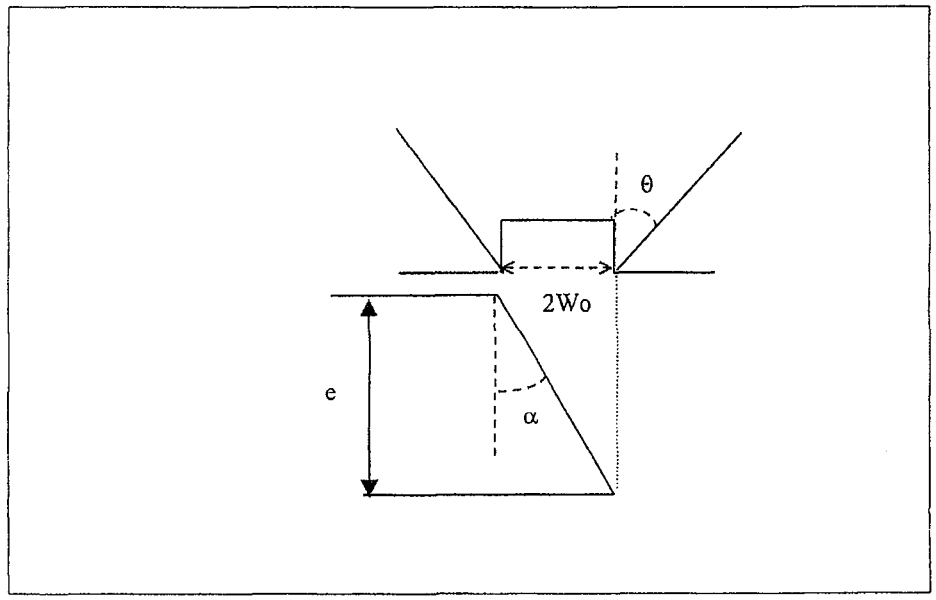
FIGURE 3
FIGURE 4
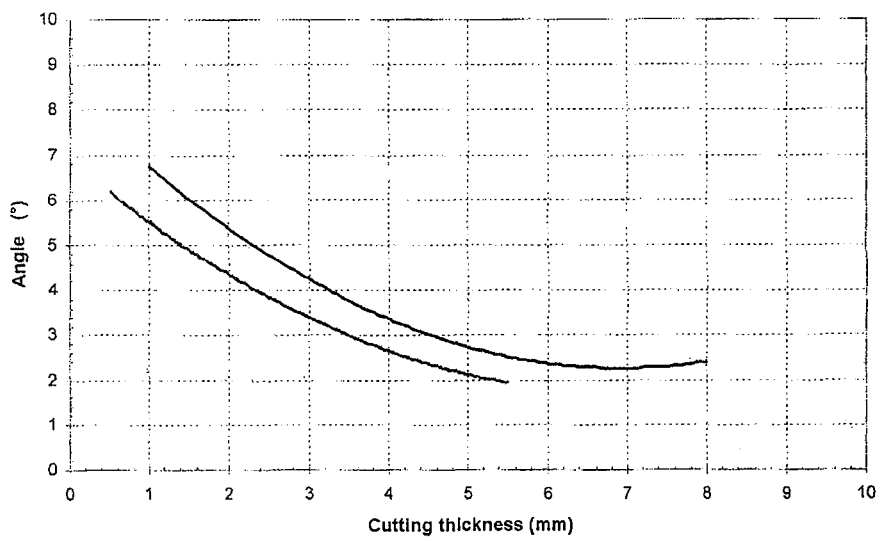

METHOD FOR CUTTING C—MN STEEL WITH A FIBER LASER

CROSS REFERENCE TO RELATED APPLICATIONS

This application claims priority to U.S. patent application Ser. No. 11/560,287, filed Nov. 15, 2006, which claimed the benefit of priority under 35 U.S.C. §119 (a) and (b) to French Application No. 0553605, filed Nov. 25, 2005, the entire contents of which are incorporated herein by reference.

BACKGROUND

The invention relates to a laser cutting method for cutting carbon-manganese (C—Mn) steel using a laser source of the ytterbium-based fiber type.

At the present time, laser cutting using a laser source of the $CO_2$ type to generate a laser beam, with a wavelength of 10.6 μm and a power ranging up to 6 kW, is widely used in industry.

This method is used in particular for cutting C—Mn steels. Within the context of the invention, the term "C—Mn steel" is understood to mean any non-alloy steel or low-alloy steel, the carbon and manganese contents of which are less than 2% by weight and the contents of the other alloying elements optionally present are less than 5% by weight.

However, the cutting speeds that can be achieved and the cutting quality that results therefrom are very variable, depending on the material to be cut and, moreover, depending on the cutting method parameters adopted, such as the nature of the assistance gas, the diameter of the focused beam, the power of the incident laser, etc.

Thus, $CO_2$ lasers cannot be used with assistance gases of low-ionization potential, for example such as argon, without the risk of generating parasitic plasmas that could impair the method.

Furthermore, $CO_2$ lasers are limited in terms of power, thereby directly impacting the cutting speed.

In addition, the fact of having to guide the laser beam from the laser generator right to the focusing head, that is to say the cutting head, has drawbacks, especially as regards alignment of the optics in the optical path. This is because guiding optics are generally polished and/or coated copper mirrors and their positions determine the path followed by the laser beam.

Therefore, the alignment of the mirrors must be perfect in order to ensure optimum entry of the laser beam into the focusing head or cutting head. Now, the position of these mirrors is generally adjusted by mechanical means, which may easily go out of alignment according to the wear of parts and the environmental conditions, such as the ambient temperature, moisture content, etc.

In addition, the optical path of the beam must necessarily be kept in an inert atmosphere in order to avoid any contamination and to maintain a medium with a constant optical index, which is necessary for good propagation of the beam. These conditions make it possible for the properties relating to the beam diameter and the transverse distribution of the beam energy, and also the beam quality properties, to remain satisfactory for the method, the quality factor for beam parameter product (BPP) of the high-power $CO_2$ laser beams used in cutting generally being between 3 mm.mrad and 6 mm.mrad. Such an atmosphere also makes it possible to preserve the guiding optics and to prevent them from deteriorating.

However, this is not practical in an industrial situation, as it complicates the installation and incurs additional costs.

In an attempt to alleviate these problems, it has been proposed to carry out the cutting with a laser device of the Nd:YAG type within which the beam is generated by a resonator containing a solid amplifying medium, namely a neodymium(Nd)-doped YAG rod, and then sent via an optical fiber to the focusing head.

However, this solution is not satisfactory from the industrial standpoint either.

More precisely, it has been found that cutting with a laser beam output by an Nd:YAG laser source with a wavelength length of 1.06 μm gives poor results in terms of cutting quality and cutting speed, in particular when cutting a workpiece made of C—Mn steel.

This is because Nd:YAG lasers have quality factors (BPP values) unsuitable for the laser cutting process hence their range from around 15 mm.mrad to 30 mm.mrad, depending on the laser source.

Now, it should be understood that the higher the quality factor of a laser, i.e. the higher the product of the focused beam waist multiplied by the beam divergence, the less effective the laser beam for the laser cutting process.

In addition, the transverse energy distribution in a focused Nd:YAG laser beam is not Gaussian but has a top-hat profile, while beyond the focal point the transverse energy distribution is random.

The limits on using Nd:YAG lasers in laser cutting, in particular for C—Mn steel, are therefore immediately understood.

More generally, to cut a C—Mn workpiece by laser cutting with an Nd:YAG laser is far from being obvious when it is desired to achieve cutting speeds and cutting qualities that are acceptable from the industrial standpoint.

The problem that arises is therefore how to provide an improved and industrially acceptable method for cutting C—Mn steels with a laser beam, which can achieve, depending on the thickness in question, speeds ranging up to 15 to 20 m/min, or even higher, and good cutting quality, that is to say straight cutting faces, no burrs, limited roughness, etc.

The solution provided by the invention is therefore a laser cutting method for cutting a C—Mn steel workpiece, characterized in that laser beam generation means comprising at least one ytterbium-containing fiber for generating a laser beam used to melt the workpiece and thereby perform the actual cutting, and in that the quality factor of the laser beam is between 0.33 and 8 mm.mrad.

The laser beam generation means comprise an exciter, preferably several exciters, which cooperate with at least one excited element, also called amplifying medium, in order to generate the laser beam. The exciters are preferably several laser diodes, while the excited elements are fibers, preferably silica fibers with an ytterbium-doped core.

Furthermore, for the purpose of the invention, the terms "laser beam generation means" and "resonator" will be used indiscriminately.

Depending on the case, the method of the invention may include one or more of the following features:

- the fiber(s) is(are) formed from an ytterbium-doped core clad with silica;
- the laser beam generated by the ytterbium-based fiber has a wavelength between 1 and 5 μm, preferably between 1.04 and 3 μm;
- the laser beam generated by the ytterbium-based fiber has a wavelength between 1.07 and 1.1 μm, preferably of 1.07 μm;
- the laser beam has a power of between 0.1 and 25 kW, preferably between 0.5 and 15 kW;

the laser beam is a continuous or pulsed laser beam, preferably a continuous laser beam;

the workpiece to be cut has a thickness between 0.25 and 30 mm, preferably between 0.40 and 20 mm;

the cutting speed is between 0.1 and 20 m/min, preferably from 1 to 15 m/min;

the assistance gas for the laser beam is chosen from nitrogen, helium, argon, oxygen, $CO_2$ and mixtures thereof, and, optionally, it further contains one or more additional compounds chosen from $H_2$ and $CH_4$;

the quality factor of the laser beam is between 1 and 8 mm.mrad, preferably greater than 2 mm.mrad, even more preferably greater than 3 mm.mrad and/or preferably less than 7 mm.mrad and even more preferably less than 5 mm.mrad;

the cutting speed for a steel workpiece with a thickness between 0.4 mm and 3 mm, using oxygen as assistance gas at a pressure of between 0.2 and 6 bar, is between 6 and 15 m/min;

the cutting speed for a steel workpiece with a thickness of between 3 mm and 6 mm, using oxygen as assistance gas at a pressure of between 0.2 and 6 bar, is between 2 and 6 m/min;

the cutting speed for a steel workpiece with a thickness of between 6 mm and 10 mm, using oxygen as assistance gas at a pressure of between 0.2 and 6 bar, is between 1 and 3 m/min;

the cutting speed for a steel workpiece with a thickness of between 10 mm and 20 mm, using oxygen as assistance gas at a pressure of between 0.2 and 6 bar, is between 0.1 and 2 m/min;

more generally, the assistance gas pressure is between about 0.1 bar and 10 bar, and is chosen according to the thickness that is to be cut; and the diameter of the gas injection orifice is between 0.5 and 5 mm, typically between 1 and 3 mm.

BRIEF DESCRIPTION OF THE DRAWINGS

FIG. 3 is a diagram illustrating the configuration.

FIG. 4 shows the variation in the optimum angle α of the cutting front as a function of the cutting thickness.

FIG. 1 appended hereto is a diagram showing the principle of an installation for implementing a laser cutting method using a laser beam 3 to cut a C—Mn steel workpiece 10, employing a laser source 1 with a resonator 2 or laser beam generation means comprising a silica fiber with an ytterbium-doped core to generate the laser beam 3.

Figure 1:
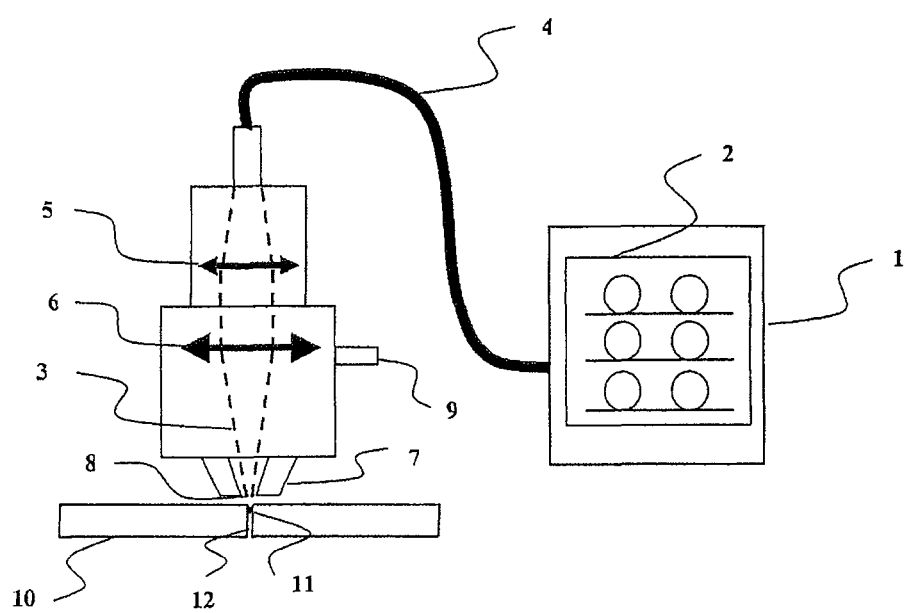
FIG. 1 is a diagram showing the principle of an installation for implementing a laser cutting method using a laser beam.

The laser source 1 is used to generate a laser beam 3 with a wavelength between 1 μm and 5 μm, more precisely, at 1.07 μm.

The beam 3 propagates through beam-conveying means 4, such as an optical fiber made of fused silica with a diameter of between 20 μm and 300 μm, as far as the zone 11 of interaction between the beam 3 and the workpiece 10 where the beam strikes the C—Mn steel workpiece and melts the constituent material of said workpiece, thus forming the kerf.

On exiting from this fiber 4, the laser beam 3 possesses particular optical characteristics and a quality factor (BPP) of between 1 and 8 mm.mrad. The beam 3 is then collimated using an optical collimator 5 equipped with a collimation doublet made of fused silica coated so as to limit the divergence of the beam exiting the fiber and to make the laser beam parallel.

The parallel beam 3, the divergence of which has been considerably limited by the collimator, is then focused onto or into the workpiece 10 to be cut by a coated, fused-silica lens 6 having a focal length of between 80 mm and 510 mm, preferably between 100 mm and 250 mm.

Before striking the workpiece 10, the beam 3 passes axially through the laser head 6, which is equipped with a nozzle 7 having an axial exit orifice 8 located facing the workpiece 10 to be cut, the beam 3 and the assistance gas passing through said nozzle. The orifice of the nozzle may be between 0.5 mm and 5 mm, preferably between 1 mm and 3 mm.

The laser head 6 itself is fed with assistance gas via a gas inlet 9, for example for an inert gas such as nitrogen, argon, helium or a mixture of several of these gases, or else an active gas, for example, such as oxygen, or even active gas/inert gas mixtures.

The pressurized assistance gas is used to remove the molten metal from the kerf 12 being formed in the workpiece 10, as the workpiece undergoes relative displacement with respect to the laser head 6 along the desired cutting path. The reverse situation, consisting in moving the cutting head while keeping the workpiece stationary gives the same result.

FIG. 3 is a diagram illustrating the configuration during cutting at the kerf (material of thickness e), where the angle of divergence θ of the laser beam after focusing, the diameter 2Wo of the focused beam and the angle α of the cutting front have been indicated.

The beam quality factor or BPP is defined as the product of the divergence angle θ multiplied by its radius Wo.

The cutting process is governed by the absorption of energy from the laser beam in the material during cutting. Depending on the wavelength of the laser beam employed, there therefore exists an optimum angle for energy absorption by the material. Outside this optimum angle, some of the energy is reflected and/or lost.

FIG. 3 illustrates the fact that, in the optimum cutting condition, the angle α of the cutting front corresponds to exposure of the entire thickness e of the material to the beam with a diameter 2Wo.

FIG. 4 shows the variation in the optimum angle α of the cutting front as a function of the cutting thickness. The upper curve corresponds to that obtained with a 4 kW $CO_2$ laser in TEM 01*mode, while the lower curve is that obtained with a 2 kW ytterbium-based fiber laser according to the invention. The two curves are not coincident because of the difference in optimum energy absorption angle at 10.6 μm, which is the wavelength of the $CO_2$ laser, and at 1.07 μm, which is the wavelength of the ytterbium-based fiber laser.

It is clearly apparent from these curves that, for small thicknesses, the optimum angle of the cutting front is higher than for larger thicknesses. The maximum angle for transmitting the laser energy into the material is obtained geometrically, and is the sum of the angles, namely α+θ.

It will therefore be understood that, when small thicknesses (a few mm) are being cut, it is necessary to use a low beam divergence angle, that is to say a small BPP, since the spot diameter is set by the fiber diameter used, in order to keep the optimum energy absorption angle constant.

It is also deduced therefrom that the transmission of the energy from the beam to the material becomes less efficient beyond a value of 8 mm.mrad.

Therefore, for the purpose of the invention, a laser beam having a quality factor preferably between 1 and 8 mm.mrad, preferably between 2 and 8 mm.mrad, is used.

EXAMPLE

To demonstrate the effectiveness of the method of the invention, several cutting trials on C—Mn steel workpieces were carried out using a resonator to generate the laser beam, which contained an amplifying medium composed of silica optical fibers with an ytterbium-doped core, which were excited by diodes according to the method of the invention. The results of these trials are given in the example below.

More precisely, the laser source used in the example below consisted of an amplifying medium formed from ytterbium-doped silica fibers, generating a laser beam of 2 kW power and 1.07 µm wavelength, propagated in a 100 µm coated fused-silica optical fiber, possessing a quality factor (BPP) on exiting the fiber of 4 mm.mrad. The collimator located at the exit of the fiber was equipped with a doublet of 55 mm focal length.

To determine the speed ranges that could be achieved with the method of the invention according to the thicknesses of the workpieces to be cut and the pressure and composition of the assistance gas employed, cutting trials were carried out on C—Mn steel workpieces having thicknesses of between 2 mm and 20 mm.

The gas used was injected into the interaction zone where the beam interacts with the workpiece at pressures varying between 0.6 and 20 bar depending on the gas used, through laser cutting nozzles having orifices with diameters ranging between 0.5 and 3 mm depending on the case.

When an active gas, such as oxygen, was used, the working pressure was 0.2 to 6 bar, whereas with an inert gas, such as nitrogen, higher pressures were generally required, namely pressures of around 8 to 20 bar. Of course, intermediate pressures could be used with inert gas/active gas mixtures, for example, with oxygen/nitrogen mixtures, or even with air.

In the present case, the trials were carried out with oxygen at pressures between 0.4 and 1 bar, typically 0.7 bar, for nozzles with a diameter ranging from 1 mm to 2.5 mm. The greater the thickness to be cut, the larger the nozzle diameter to be used, the diameter adopted being chosen empirically by carrying out routine tests.

Focusing lenses with a focal length of between 127 mm and 190.5 mm were used to focus the laser beam generated by a resonator based on ytterbium-doped fibers. More precisely, for a 2 mm thickness to be cut, a lens with a focal length of 127 mm was used, while for the other thicknesses, a focal length of 190.5 mm was used. This beam was conveyed to the focusing lens of the cutting head by optical conveying means, such as a 100 µm-diameter optical fiber.

Figure 2:
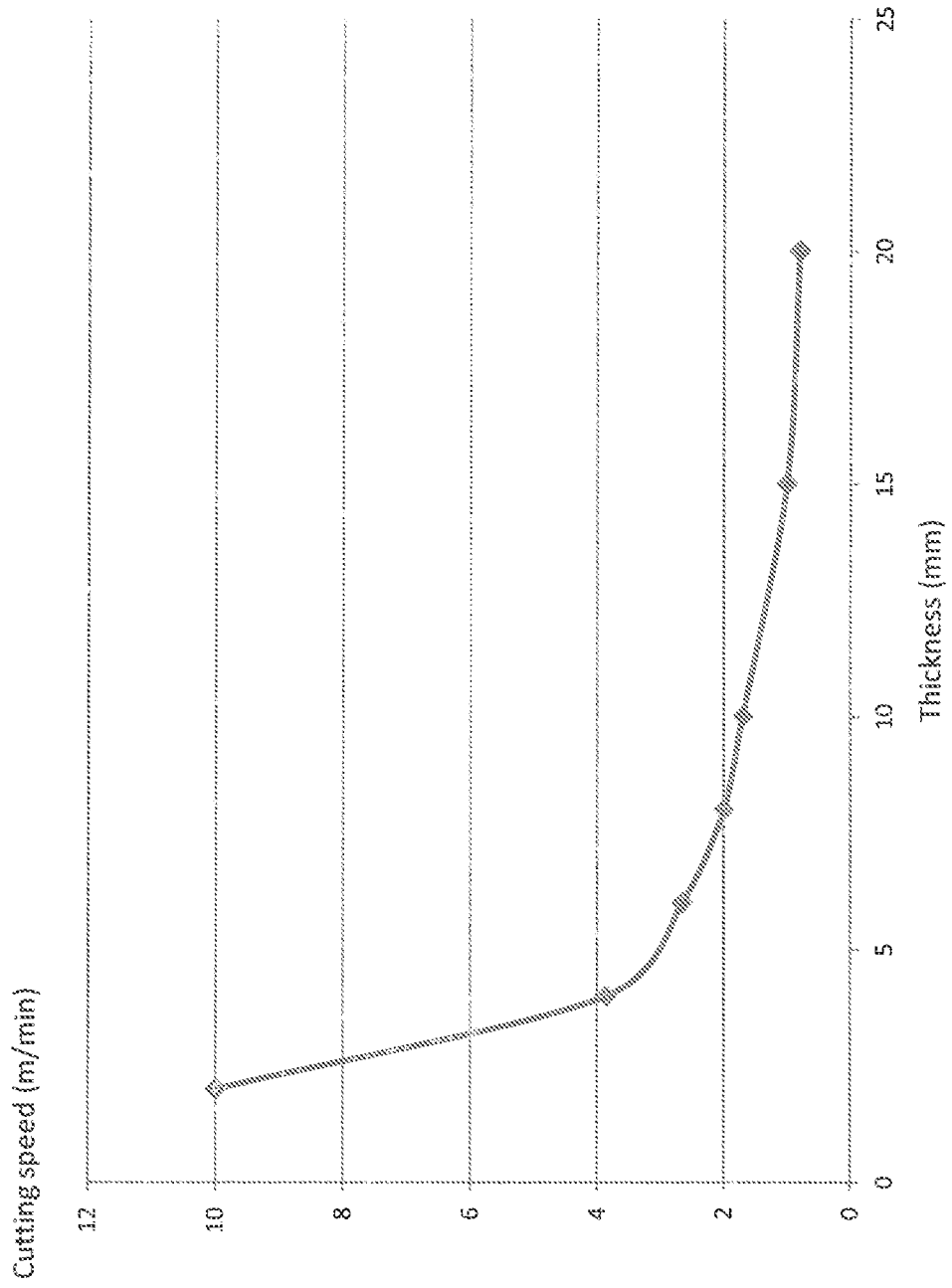
FIG. 2 shows the speed obtained (plotted on the y-axis) as a function of the thickness to be cut (plotted on the x-axis).

The results obtained are given in the appended FIG. 2, which shows the speed obtained (plotted on the y-axis) as a function of the thickness to be cut (plotted on the x-axis).

This figure shows that, on a 2-mm thick plate, under the abovementioned conditions, a speed of 10 m/min was achieved and that, logically, the cutting speed decreased with an increase in thickness of the material cut.

Moreover, it should be emphasized that, after visual examination, for all cut thicknesses between 2 and 15 mm, the quality of the cut, in terms of burrs, oxide edge and striations, was considered to be very satisfactory from an industrial standpoint. The maximum thickness cut under these conditions and giving good results was about 20 mm.

In other words, the method of the invention has demonstrated its effectiveness in terms of cutting speed and cut quality, in particular for thicknesses of less than 20 mm.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A laser cutting method for cutting a C—Mn steel workpiece, wherein laser beam generation means comprising at least one ytterbium-containing fiber for generating a laser beam and an assistance gas for the laser beam are used, and in that the workpiece to be cut has a thickness between 2 mm and 30 mm, the quality factor of the laser beam is between 1 mm.mrad and 8 mm.mrad, and the assistance gas for said laser beam is oxygen and the assistance gas pressure is between 0.2 bar and 0.1 bar.

2. The method of claim 1, wherein said fiber is formed from an ytterbium-doped core clad with silica.

3. The method of claim 1, wherein said laser beam generated by the ytterbium-based fiber has a wavelength between 1 and 5 µm.

4. The method of claim 1, wherein said laser beam generated by the ytterbium-based fiber has a wavelength between 1.07 and 1.1 µm.

5. The method of claim 1, wherein said laser beam has a power of between 0.1 kW and 25 kW.

6. The method of claim 1, wherein said laser beam is a continuous or pulsed laser beam.

7. The method of claim 1, wherein the workpiece to be cut has a thickness between 2 mm and 20 mm.

8. The method of claim 1, wherein said cutting speed is between 0.1 mm and 20 m/min.

9. The method of claim 1, wherein the quality factor of said laser beam is greater than 2 mm.mrad and less than 7 mm.mrad.

* * * * *